F. A. Morley,
Potato Digger.
No. 91,036.  Patented June 8, 1869.
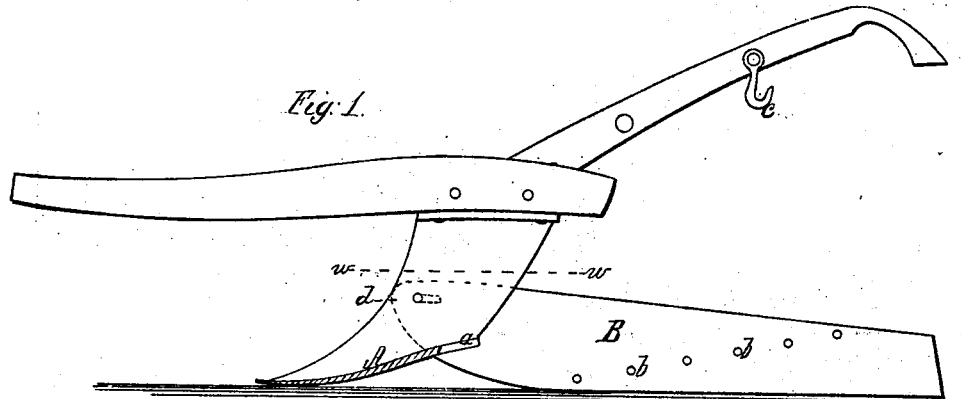
Fig. 1.
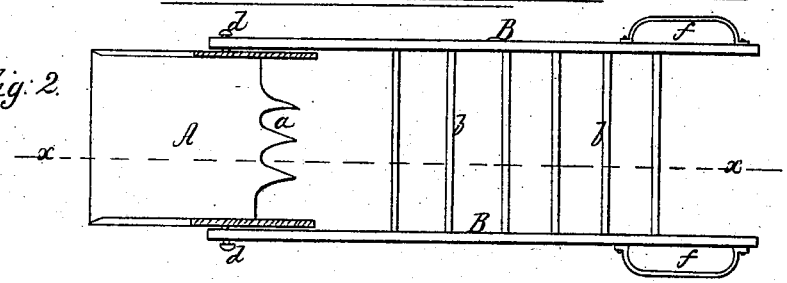
Fig. 2.
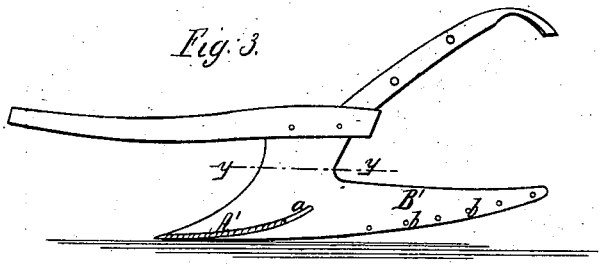
Fig. 3.
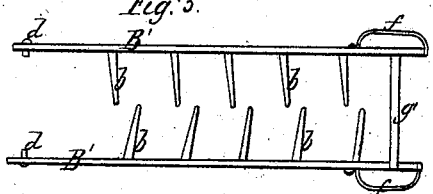
Fig. 5.
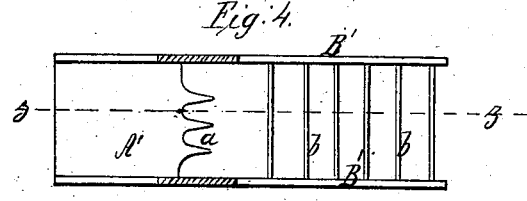
Fig. 4.
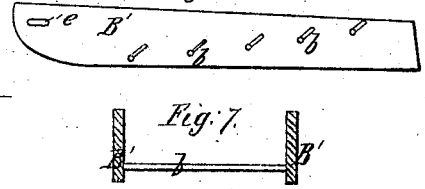
Fig. 6.
Fig. 7.
Witnesses:
C. C. Warner
D. B. Day
Inventor,
F. A. Morley

United States Patent Office.

F. A. MORLEY, OF SYRACUSE, NEW YORK.

Letters Patent No. 91,036, dated June 8, 1869.

---

IMPROVEMENT IN POTATO-DIGGERS.

---

The Schedule referred to in these Letters Patent and making part of the same.

---

*To all whom it may concern:*

Be it known that I, F. A. MORLEY, of Syracuse, in the county of Onondaga, and State of New York, have invented a new and useful Improvement in Potato-Diggers; and I do hereby declare that the following is a full, clear, and exact description thereof, which will enable those skilled in the art to make and use the same, reference being had to the accompanying drawings, forming part of this specification, in which—

Figure 1 is a longitudinal section, taken in the line $x\ x$ in fig. 2.

Figure 2 is a horizontal section, taken in the line $w\ w$ in fig. 1.

Figure 3 is a longitudinal section, taken in the line $z\ z$ in fig. 4, showing a modification of fig. 1.

Figure 4 is a horizontal section of fig. 3, taken in the line $y\ y$ in fig. 3.

Figures 5, 6, and 7 are views showing modifications in the construction of the screening-bars.

Similar letters of reference indicate like parts in all the figures.

In the accompanying drawings—

A is a shovel-plow, having two side-boards, B B, projecting to the rear.

These side-boards have a series of cross-bars, $b$, arranged at different heights, for separating the potatoes from the dirt, and are made somewhat in the form of sled runners, and pivoted to the sides of the plow by pivots $d$, so that the point of the plow may be guided to a proper depth freely in digging, and so that the screen B $b$ may be raised clear of the ground, for turning the plow around, or for transportation from field to field.

The screen B $b$ is held up by a hook, $c$, which is hooked on to one of the bars $b$. However, the side-boards B may be rigidly attached to the plow, as shown in figs. 3 and 4.

The duty of the plow is to merely break up and soften the ground, and prepare the way for the screen. The dirt, running up on to the plow, falls over its rear end, and is thus broken up, so that the bars $b$ pass through the dirt readily without carrying it along with them, and by successively acting on the potatoes crowd them out to the surface of the ground. As the first bar, $b$, strikes a potato, the potato rises in the dirt and passes over the top of the bar, and it is then struck by the next bar and raised another step, and so the operation continues until the potato has reached the surface.

The side-boards B B hold the dirt from spreading out laterally beyond the reach of the bars $b$, before the separating-process has been completed.

The rear end of the plow has a few fingers, $a$, to aid in breaking up the dirt as it falls from the rear end of the plow, and to aid in keeping the vines, grass, &c., above the dirt as much as possible.

The pivot-holes in the forward ends of the side-boards are elongated, as shown by hole $e$, fig. 6, so that the direction of the plow may be changed laterally, slightly, while the screen B $b$ is down, and the screen not bind such movement.

The screen is provided with small platforms $f\ f$, fig. 2, at its rear end, for the operator to stand upon and ride and guide the implement without treading on the potatoes, and give his whole attention to guiding the implement.

Fig. 5 shows a modification in which the screening-bars $b'$ are cut at the centre, to form an escape for vines or grass that may lodge on them. When the bars are so cut, the side-boards B' B' are connected to each other by a strong bar, $g$, fig. 5, which is made arching upward, so that the vines, &c., will have plenty of room to pass under it without coming in contact with it.

Figs. 6 and 7 show a bar modified, by having a series of short fingers projecting upward, with a slight inclination to the rear.

The side-boards B can be made of wood or iron, and may be slotted to allow a portion of the dirt to rattle through, while the potatoes are retained between them; however, I consider them preferable when having a smooth, unbroken surface, as shown.

I do not claim a drag-screen or separator, in combination with a plow or other device, for pulverizing the ground; nor do I claim attaching the drag to the plow by a hinge-joint, so that the drag may be elevated or depressed, as these have been used heretofore; but

What I claim, and desire to secure by Letters Patent, is—

1. The side-boards B B and cross-bars $b$, as shown in fig. 1, in connection with plow A, as herein shown and described, and for the purpose set forth.

2. In connection with a screen, B $b$, and plow A, the standing platforms $f\ f$, substantially as and for the purpose set forth.

3. Attaching the screen B $b$ to the plow A, by means of pin $d$ and slot $e$, as shown and described, for the purpose set forth.

F. A. MORLEY.

Witnesses:
C. E. WARNER,
D. B. DAY.